United States Patent [19]

Hadermann et al.

[11] Patent Number: 4,501,828
[45] Date of Patent: Feb. 26, 1985

[54] DISSOLVING WATER SOLUBLE POLYMERS

[75] Inventors: Albert F. Hadermann, Ijansville, Md.;
Jerry C. Trippe, Fairfax Station, Va.;
Paul F. Waters, Washington, D.C.

[73] Assignee: General Technology Applications, Inc., Reston, Va.

[21] Appl. No.: 459,506

[22] Filed: Jan. 20, 1983

[51] Int. Cl.³ .................... C08L 33/26; C08L 71/02
[52] U.S. Cl. ................................ 523/309; 106/170;
106/203; 106/208; 106/197.1; 523/307;
523/175; 524/555; 524/612; 524/908
[58] Field of Search ............... 523/307, 309, 175;
106/170, 197 C, 197 R, 203, 208; 524/555, 612, 908

[56] References Cited

U.S. PATENT DOCUMENTS

| 2,413,758 | 1/1947 | Fremon | 523/307 |
|---|---|---|---|
| 3,251,194 | 5/1966 | Walker | 524/555 |
| 3,536,646 | 10/1970 | Hatch et al. | 524/555 |
| 3,651,008 | 3/1972 | Moser et al. | 523/309 |
| 3,736,288 | 5/1973 | Stratta et al. | 524/612 |
| 3,891,593 | 6/1975 | Smitherman et al. | 523/175 |
| 3,899,439 | 8/1975 | Mahlman | 106/203 |
| 3,941,865 | 3/1976 | Miller et al. | 524/612 |
| 3,958,997 | 5/1976 | Greenberg | 106/38.5 R |
| 4,069,161 | 1/1978 | Pogers | 524/555 |
| 4,088,622 | 5/1978 | Pearl | 523/175 |
| 4,088,623 | 5/1978 | Pearl | 523/175 |
| 4,113,688 | 9/1978 | Pearson | 524/555 |
| 4,179,367 | 12/1979 | Barthell et al. | 524/555 |
| 4,310,434 | 1/1982 | Choy et al. | 524/612 |
| 4,341,684 | 7/1982 | Krantz | 523/175 |

FOREIGN PATENT DOCUMENTS

| 566343 | 11/1958 | Canada | 523/307 |
|---|---|---|---|
| 1299118 | 7/1969 | Fed. Rep. of Germany | 523/307 |
| 753173 | 7/1956 | United Kingdom | 523/309 |

OTHER PUBLICATIONS

Union Carbide Corporation Bulletin No. F-42933, "How to Dissolve Polyox Water-Soluble Resins", (1970).

Ting et al.; "Characterization of Drag Reduction and Degradation Effects . . . ", *J. App. Pol. Sci.*, vol. 17, pp. 3345–3356, (1973).

*Primary Examiner*—Ronald W. Griffin
*Attorney, Agent, or Firm*—Roland H. Shubert

[57] ABSTRACT

High molecular weight, water soluble polymers are dissolved to form liquid solutions at relatively low polymer concentrations and solid, water-plasticized composites at higher polymer concentrations by admixing finely divided polymer particles with ice particles at temperatures below, and preferably far below, the freezing point of water. The admixture is then allowed to warm causing the ice to melt and the polymer to dissolve in the water.

15 Claims, 3 Drawing Figures

DISSOLVING WATER SOLUBLE POLYMERS

BACKGROUND OF THE INVENTION

This invention is directed generally to a method for dissolving high molecular weight, water soluble polymers.

One embodiment of this invention is directed to the dissolving of water soluble polymers to form a liquid solution.

Another embodiment of this invention is directed to the dissolving of high concentrations of polymers in water and other solvents to form solid, homogeneous, essentially solvent-plasticized, composites and to the uses of those composites.

Although many of the high molecular weight water soluble polymers, the poly (ethylene oxide) polymers for example, are extremely soluble in water, nevertheless they are quite difficult to dissolve. The polymer particles adhere strongly to one another upon wetting forming clumps of undissolved polymer and partially dissolved gel lumps which are difficult to disperse and which require long agitation time to obtain a uniform solution.

While the dissolving rate can be increased either by use of high temperatures or intense agitation, these practices are undesirable. If high shear agitation is employed to enhance dissolving rate, the shearing forces cause rupture or breakage of the polymer chain thus reducing the molecular weight of the polymers in solution. Consequently, a number of specialized procedures and apparatus have been developed to prepare solutions of these polymers on a small batch scale and in a larger volume continuous manner. Bulletin No. F-42933 of the Union Carbide Corporation entitled "How to Dissolve Polyox Water-Soluble Resins" is illustrative of approaches taken in the prior art to the problems encountered in the dissolving of Polyox (a registered trademark of the Union Carbide Corporation for poly (ethylene oxide) resins). As noted therein, individual polymer particles must be dispersed throughout the liquid to avoid agglomeration and lump formation. For batch processes, a predispersion technique in which the polymer particles are first dispersed in a water-miscible non-solvent, gives good results. The non-solvent may comprise an organic liquid such as isopropanol, a relatively concentrated aqueous salt solution, or even boiling water as the polymer precipitates from water at or near the boiling point. After dispersing the polymer in the nonsolvent, water is added with continuous agitation to dissolve the polymer.

The main disadvantages of the predispersion technique are the introduction of foreign materials (non-solvents) into the final solution, the relatively cumbersome and time consuming procedures involved and the inability to obtain relatively concentrated polymer solutions. Solutions of high molecular weight polymers, e.g., those having a molecular weight above about 3,000,000 are extremely viscous semi-solids to solids at polymer concentrations above about 5%. The dissolving machines so far developed likewise are incapable of producing concentrated polymer solutions.

One important use of extremely dilute polymer solutions is for the reduction of hydrodynamic drag of water flowing through a conduit or of an object moving through water. This effect is well known and is utilized for such purposes as enhancing water flow and stream reach in fire fighting. Friction reductions as great as 70% or more have been reported for high molecular weight poly (ethylene oxide) concentrations of 50 ppm or less flowing through a pipe. However, as shown by a number of research papers, the extent of drag reduction obtained is a direct function of molecular weight, increasing as molecular weight increases, and is very sensitive to polymer degradation through shear effects. One exemplary paper is that of Ting et al, entitled "Characterization of Drag Reduction and Degradation Effects in the Turbulent Pipe Flow of Dilute Polymer Solutions" published in J. Applied Polymer Science, Vol. 17, pp. 3345–3356, (1973). As shown in that paper, repeated passes of the same sample solution through a pipe system resulted in continuing decreases in the observed drag reduction.

Rotary pumps, particularly high speed centrifugal pumps, produce much more severe shear forces than those incurred in the turbulent flow of liquids through a pipe. Consequently, molecular weight degradation of dilute polymer solutions is especially extreme in those systems pumping water at relatively high pressures and velocities such as those commonly employed in fire fighting. Yet the prior art has been unable to develop a practical technique for the continuous production of low concentration polymer-water streams without degrading the polymer by passing the solution through pumps.

SUMMARY OF THE INVENTION

A method for dissolving water soluble polymers, especially high molecular weight polymers, to form solutions of any desired concentration is provided. Polymer particles in powder form are admixed with frozen solvent particles at temperatures whereat no solvent melting occurs. The admixture is allowed to warm to a temperature above the solvent melting point whereupon the polymer particles dissolve in the melting solvent. Solid solutions containing substantially more than 50% polymer can be produced and formed into rigid structural shapes, which shapes may then be employed to bleed polymer into a flowing solvent stream without shear degradation of the polymer molecules.

Hence, it is an object of this invention to provide an improved process for the dissolving of water soluble polymers.

It is another object of this invention to form highly concentrated solid solutions of high molecular weight polymers in water.

Yet another object of this invention is to provide means and methods for the use of highly concentrated, solid polymer solutions in the production of extremely dilute polymer solutions without shear degradation of the polymer during dissolving.

DESCRIPTION OF THE DRAWING

Specific embodiments of the invention are illustrated in the drawing in which.

DISCUSSION AND DESCRIPTION OF THE INVENTION

Figure 1:
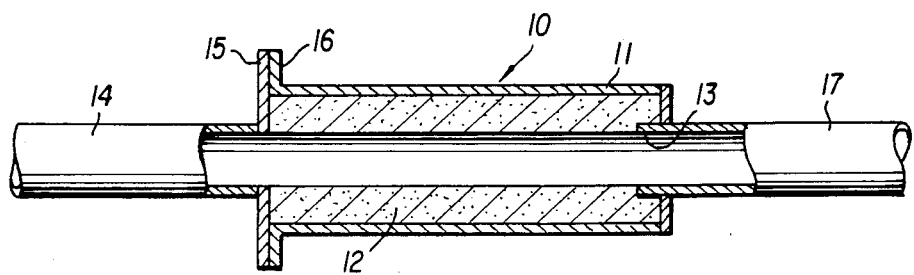
FIG. 1 is a partial sectional view of a dissolving device employing a solid polymer-solvent composite made by the process of this invention.

It has been found that water soluble polymers, especially very high molecular weight polymers, can be dissolved rapidly to achieve any desired concentration without discernable molecular weight degradation. To achieve this result, the polymer in finely divided particulate form is mixed with frozen solvent particles at a temperature substantially below the freezing point of the solvent. The solvent and polymer particles are admixed to form a homogeneous blend and are then allowed to warm to a temperature whereat the solvent melts. As the solvent melts polymer dissolves in the resulting liquid to form a uniform solution.

This technique is applicable to the formation of solutions having concentrations encompassing the entire range of miscibility of the polymer and solvent. While it is useful in preparing relatively dilute polymer solutions, on the order of 1% or less, the process of this invention finds particular advantage in the preparation of concentrated polymer solutions; those having a polymer concentration ranging upward of 5% to as high as 75% or even more. Solutions of high molecular weight polymers display the characteristics of extremely viscous liquids at concentrations of about 2% to 3%, are typically non-pourable semi-solids at concentrations of about 5% to 10% and become progressively more solid like at higher concentrations. It becomes essentially impossible to prepare high concentration polymer solutions, those of solidlike form, using techniques which employ stirring or similar agitation methods.

In its broadest form, this invention comprises mixing relatively finely divided, water soluble polymer particles with particles of frozen solvent at a temperature below the melting point of the solvent. The admixture is allowed or caused to warm to a temperature above the melting point of the solvent whereupon individual polymer particles dissolve in adjacent melting solvent particles to form a homogeneous solution; either liquid, semi-solid or solid depending upon the ratio of polymer to solvent.

As was set out before, the process of this invention is useful in the preparation of solutions of those water soluble polymers which tend to agglomerate upon wetting and finds particular advantage in the preparation of concentrated solutions of all water soluble polymers. Illustrative polymers for which the dissolving process of this invention is suited include the olefin oxide polymers, especially poly (ethylene oxide), the cellulose based polymers including methyl cellulose, hydroxyethyl cellulose, carboxymethyl cellulose and the like; the polyacrylamide polymers, polyvinyl alcohol, guar and similar plant gums and the like.

The process of this invention is primarily useful in the preparation of water-polymer solutions. However, it is applicable as well to the preparation of solutions of certain water soluble polymers in selected non-aqueous solvents. For example, poly (ethylene oxide) displays a significant degree of solubility in such solvents as acetonitrile and certain halogenated hydrocarbons such as trichloroethylene. However, organic solvents do not cause particle agglomeration and gel formation as extensively as does water so the primary advantage of this process when used with organic solvents is in the preparation of polymer solutions of high concentration.

In order to obtain optimum results, it is important that both the polymer and frozen solvent be in relatively finely divided form. Many of the water soluble polymers are commercially available as powders having a maximum particle size in the general range of about 35 mesh and this general size range works well in the process. When forming water solutions, which is a preferred embodiment of this invention, the ice may be formed into appropriately sized particles in a number of ways. Water may be frozen in cube form and thereafter crushed at sub-freezing temperature to form particles of appropriate size. A more preferred technique comprises spraying of liquid water into a cold atmosphere to freeze individual droplets of water. The cold atmosphere may be a gas or, more preferably, may be a liquid refrigerant. Useful liquid refrigerants include the low boiling point Freon's, liquified petroleum gases such as propane, and the liquified fixed gases such as liquid nitrogen. Ice particles formed by spraying water into a liquid refrigerant are of generally spherical shape, which contributes to efficient mixing with polymer particles, and may be obtained in the desired size range by proper nozzle selection. Best results are obtained when the frozen water particles are comparable in size to the polymer particles.

In one preferred embodiment of this invention, a solution of water and high molecular weight polymer is formed in the following fashion. Water is sprayed into a liquid refrigerant, suitably liquid nitrogen, using a nozzle delivering water droplets having a median size approximating the median size of the polymer particles. There is formed a slurry of spherical ice particles within the liquid refrigerant. A quantity of polymer powder is added directly to the ice particle-liquid refrigerant slurry; the proportions of ice and polymer being selected to provide the desired solution concentration. The agitation provided by the evaporating liquid refrigerant is usually sufficient to provide uniform mixing of ice and polymer but mechanical mixing techniques may be used in place of or in addition to the mixing effects obtained from the boiling liquid refrigerant.

Excess liquid refrigerant may be allowed to evaporate or may be filtered off. Thereafter, the mixture is allowed to warm to a temperature above the ice melting point with formation of a uniform solution upon melting. Concentrations of high molecular weight polymer in water above about 5% are extremely viscous, purable semi-solids to solids at room temperature. The cold solid admixture of ice and polymer may be pressed in a mold under moderate pressure to form a solid shape, i.e., a cylinder, plate, sheet or the like. Further, the cold admixture may be extruded during or after ice melting or solution formation to create extruded shapes. For example, a 50-50 solution of water and a commercially available poly (ethylene oxide) sold under the designation Polyox WSR-301 is readily extrudable at room temperature and pressures of less than 1000 psi. This particular polymer has a reported molecular weight of about 4,000,000.

Pressed or extruded solid solutions of high molecular weight polymer and water are particularly advantageous in certain applications. By passing water over or through one of such polymer-water shapes, there is continuously dissolved low levels of polymer into the flowing water stream. This application is illustrated generally in FIGS. 1 and 2.

Referring now to FIG. 1, there is shown in partial cross-section a device 10 for continuously dissolving a polymer such as poly (ethylene oxide) in a flowing water stream. The device comprises a housing 11 adapted to contain and hold a solid, polymer-water insert 12. Insert 12, which conveniently may be in the form of a relatively thin-walled cylinder, is held in place within housing 11 by retaining means 13 which may be in the form of an annular flange. The upstream end of housing 11 is connected to conduit 14 providing a flow of water through and across polymer-water insert 12. Provision is made at one or the other ends of housing 11, shown here at the upstream end, for detaching the housing from conduit 14 so as to allow insertion and replacement of insert 12 after use. Suitable detaching means may comprise a pair of mating flanges 15 and 16, may comprise a threaded coupling, or may comprise any other conventional connection means allowing the detachment of housing 11 and the replacement of insert 12. Exit conduit 17 is provided at the downstream end of housing 11 for transport of the water stream, now containing low concentrations of polymer dissolved from insert 12, to a place of use.

Figure 2:
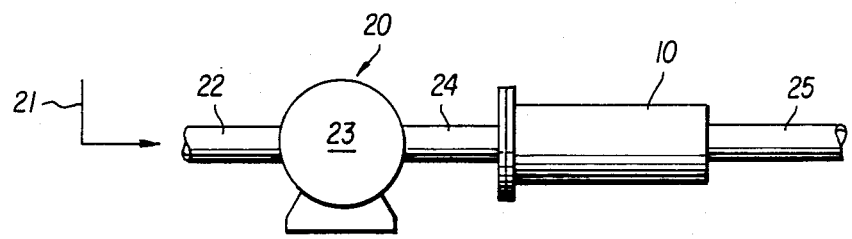
FIG. 2 is a schematic representation of a system employing the dissolving device of FIG. 1.
Figure 3:
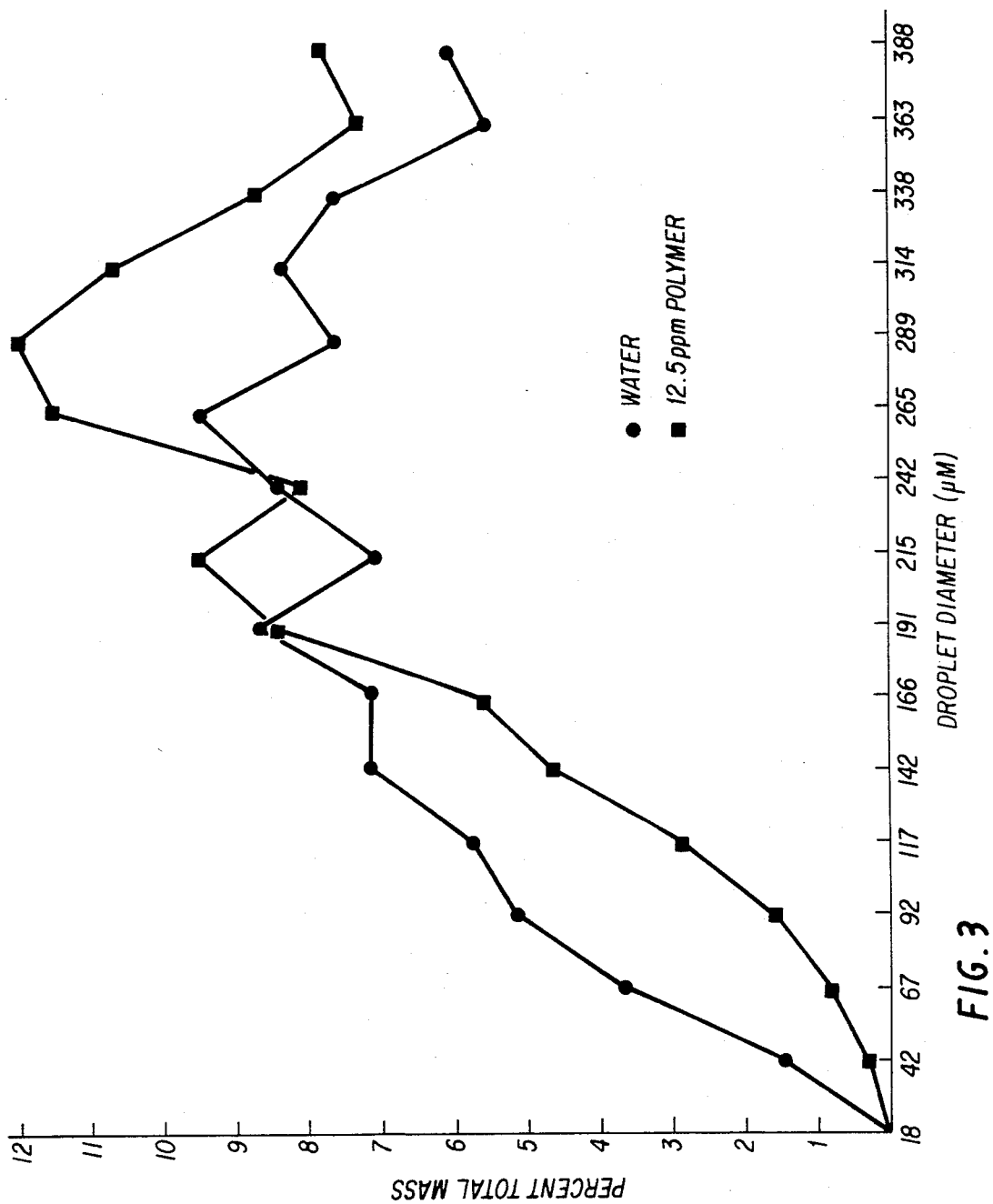
FIG. 3 is a plot showing the antimisting effect obtained by addition of low concentrations of polymer to a water stream.

FIG. 2 illustrates a generalized system 20 adapted for use of the device of FIG. 1. A water stream 21, from any convenient source, is introduced into the suction entry 22 of pump 23. Pump 23 discharges a high pressure stream into line 24 which has mounted thereon dissolving device 10 of FIG. 1. The high pressure water stream, after passing through device 10, is conducted to a point of use through conduit means 25.

A specific application of system 20 is in firefighting. In this application, water stream 21 would typically be obtained from a water main, pump 23 would be that of the standard pumper truck and conduit 25 would comprise lengths of hose. Prior art approaches to the addition of high molecular weight polymers to water for flow enhancement in firefighting use employ a polymer supply in the form of a particulate slurry of polymer particles in a water soluble liquid vehicle. A pumper truck is provided with a slurry reservoir which feeds a slurry pump discharging into a mixer. Within the mixer, polymer slurry is diluted with water taken as a high pressure bleed stream from the discharge side of the fire pump. The diluted polymer slurry is then injected into the suction side of the fire pump which typically is a two-stage centrifugal. This technique, as well as requiring complex equipment, subjects the dissolving polymer to high shear conditions within the fire pump tending to degrade the polymer and decrease its effectiveness for flow enhancement.

For purposes of drag reduction, or flow enhancement, of water flowing through a hose or pipe, concentration of polymer in the water stream will range from 5 to about 500 ppm, typically between 5 and 100 ppm, depending upon the degree of drag reduction desired and the molecular weight of the polymer. When using the highest molecular weight poly (ethylene oxide) polymer commercially available, a molecular weight of about 5 to 6 million, drag reductions as high as 70% can be attained using polymer concentrations in the general range of about 5 to about 25 ppm.

A number of different parameters of dissolving device 10 can be varied to achieve any desired polymer concentration in the exiting water stream. The geometric configuration of polymer-water insert 12 may be varied to adjust the insert surface area in contact with the flowing water stream by increasing or decreasing either the length of the insert, its internal diameter or both. Insert 12 may be formed as spaced apart flat or spirally wound plates with water flowing between to further increase the surface area. A backing or support for the insert may be provided to increase its rigidity. Velocity of the water flowing through or across the insert surface also affects the dissolving rate; the greater the velocity generally the lower is the concentration of the resulting polymer solution. Dissolving rate of the polymer-water insert is also greated influenced by the polymer to water ratio of the insert. A minimum polymer concentration of about 15% to 25%, depending upon polymer molecular weight, is required to obtain sufficient structural strength and rigidity for the insert to properly function. Polymer concentrations above about 70% to 80% tend to cause difficulty in forming into inserts but high polymer concentrations are also advantageous in that they provide higher capacities for the same insert size. Generally speaking, the lower the polymer concentration of the insert, all other factors remaining the same, the faster it will dissolve in a flowing water stream. It is generally preferred that the insert have a polymer concentration of at least 25% but lower than about 75%.

System 20, illustrated in FIG. 2, also finds use in antimisting or mist control applications. One example of such mist control applications is in the field of agricultural spraying of water base herbicide or pesticide solutions, emulsions or suspensions. Spraying may be carried out by either aerial or ground application by directing the herbicide or pesticide formulation through nozzles and onto the crop or land surface. In this application, dissolving device 10 is placed down stream of the spray pump but forward of the distribution lines and nozzles.

All of the nozzle types conventionally used produce a rather broad range of droplet sizes. The very small droplets are extremely undesirable in most field applications because of their low settling velocity and tendency to drift away from the spray target area. Spray drift away from the target area can of course cause severe damage to adjacent crop areas especially with use of herbicides. Formation of the very tiny, drift-prone droplets can be substantially reduced by dissolving small quantities of high molecular weight polymer in the water carrier.

FIG. 3 illustrates the magnitude of the antimisting effect obtainable at very low levels of polymer addition. The figure is a plot of droplet diameter v. percent of total spray mass for two spray runs using the spray nozzle and spraying conditions. The data was obtained through use of a spray particle counter consisting of a laser probe coupled to size analysis and computing means capable of counting the number of particles in each of the various size ranges and calculating the mass fraction within each range. Curve 31 represents results obtained by analysis of a water spray while curve 32 represents results obtained with a water solution of poly (ethylene oxide) of molecular weight of approximately 4 million at a concentration of 12.5 ppm. As can be appreciated from those data, there was obtained a very substantial reduction of the tiny drift-prone droplets, those having a droplet diameter of less than about 100 microns, through use of the polymer solution.

The following examples illustrate specific aspects and particular embodiments of the invention which, however, is not to be construed as limited thereby.

EXAMPLE 1

Poly (ethylene oxide) having a molecular weight, as reported by the manufacturer, of about 4 million was dissolved in water to form a 50% solid solution by the following procedure. A quantity of water was sprayed in fine droplet form into an insulated container holding liquid nitrogen. The water droplets froze to form generally spherical ice particles having a diameter on the order of 40 microns. Poly (ethylene oxide) in fine powder form as received from the manufacturer was added to the liquid nitrogen-ice particle slurry in an amount by weight equal to the weight of water. Turbulence created by the boiling, evaporating liquid nitrogen provided thorough mixing of the ice and polymer particles.

A quantity of the mixed slurry, free of liquid nitrogen but at very cold temperature, was placed into a cylindrical mold and subjected to pressure of about 300 to 400 psi and was allowed to warm in the mold to ambient temperature. There was obtained a solid, monolithic cylinder completely homogeneous in appearance without voids or other physical imperfections.

EXAMPLE 2

A poly (ethylene oxide)-water ice slurry formed as in Example 1 and containing equal quantities of polymer and water ice was placed into a die. At pressures of about 500 psi, the material could be extruded into film having a thickness on the order of 0.1 mm.

EXAMPLE 3

A quantity of the polymer-water ice slurry of Example 1 was pressed between a pair of flat plates and allowed to warm to room temperature. The resulting sheet had a substantial degree of physical strength and was uniform and homogeneous in appearance.

A flowing water stream was directed across the surface of the sheet. By adjusting the water flow rate across the sheet, there was obtained polymer-water solutions having concentrations ranging from less than 20 ppm to more than 100 ppm.

EXAMPLE 4

A quantity of ice particles were produced by spraying liquid water into liquid nitrogen. After evaporation of the liquid nitrogen, the frozen water particles were free flowing and had the appearance of a fine sand.

Liquid Freon-12 was then added to the ice particles in a small Dewar flask. Freon-12 is the trademark designation for dichlorodifluoromethane which has a normal boiling point of $-29.8°$ C. Poly (ethylene oxide) having a molecular weight of approximately 4,000,000, in powder form as received from the manufacturer, was then added to the slurry of ice particles in liquid Freon-12 in an amount providing a polymer concentration in the resulting solution of 23.6% by weight.

The mixture was thoroughly stirred and the liquid Freon-12 was filtered off using a standard paper filter. The filter cake, comprising ice and polymer, was then placed into a plastic bag which was sealed and immersed in hot water. Melting occurred rapidly, over a period of a few minutes, to produce a homogeneous solid solution of polymer in water. The solution was transluscent to colorless in appearance and was flexible, rubbery and elastic in properties.

The procedure was repeated using a lesser quantity of polymer; enough to provide a solution concentration of 1.22%. Upon melting, there was obtained a viscous, transparent liquid.

While the invention has been described in relation to certain specific applications and embodiments, it will be apparent to those skilled in the art that it will find use in all of those applications requiring high concentrations of polymer in solution and in the formation of dilute polymer solutions without shear degradation of the polymer.

We claim:

1. A method for dissolving relatively high molecular weight water-soluble polymers in liquids which are solvents for those polymers comprising:
   freezing said solvent and forming it into relatively finely divided, free flowing solid particles;
   chilling particulate solid polymer to a temperature below the freezing point of said solvent;
   mixing said frozen solvent particles with said chilled particulate polymer, and
   allowing said mixture to warm to a temperature above the freezing point of said solvent whereby polymer particles dissolve in melting solvent particles to form a solution.

2. The method of claim 1 wherein said solvent is water.

3. The method of claim 2 wherein said water soluble polymer is selected from the group consisting of poly (ethylene oxides) and polyacrylamides.

4. The method of claim 3 wherein said polymer has a molecular weight in excess of 3 million.

5. The method of claim 2 wherein particles of frozen water are mixed with polymer in a liquid refrigerant.

6. The method of claim 5 wherein the particles of frozen water are formed by spraying liquid water droplets into said liquid refrigerant.

7. The method of claim 2 wherein said polymer has a molecular weight in excess of about 3 million and wherein the solution has a polymer concentration greater than 10%.

8. The method of claim 7 wherein said solution is a solid at room temperature and is formed into a monolithic shape by pressing or extruding.

9. The method of claim 8 wherein said polymer is selected from the group consisting of poly (ethylene oxide) and polyacrylamides.

10. The method of claim 9 wherein said solid shaped polymer solution has a polymer concentration between 25% and 75%.

11. A method for dispensing high molecular weight water soluble polymers into a flowing water stream which comprises:
    forming a solid aqueous solution of a high molecular weight polymer by freezing water and forming it into relatively finely divided, free flowing, ice particles, chilling particulate solid polymer to a temperature below the freezing point of water, mixing said ice particles with said chilled particulate polymer, allowing the mixture to warm to a temperature above the freezing point of water thereby causing polymer particles to dissolve in melting ice particles to form a solid solution and forming said solid polymer solution into a monolithic geometric shape, and
    passing a flow of water across the surface of said geometric shape whereby polymer is dissolved in said water flow to form a dilute liquid solution.

12. The method of claim 11 wherein the concentration of polymer in said solid aqueous solution is at least 25% by weight.

13. The method of claim 12 wherein the surface area of said shaped solid solution of polymer exposed to the flow of water and the flow rate of said water across the polymer surface are adjusted to provide a dissolution rate of the polymer in the water such that the concentration of dissolved polymer in water is in the range of about 5 to about 500 ppm.

14. The method of claim 13 wherein said water soluble polymer has a molecular weight in excess of about 3 million.

15. The method of claim 14 wherein said polymer is a poly (ethylene oxide).

* * * * *